Sept. 27, 1955     C. A. NORGREN ET AL     2,718,934
OIL FOG GENERATOR
Filed Sept. 12, 1952
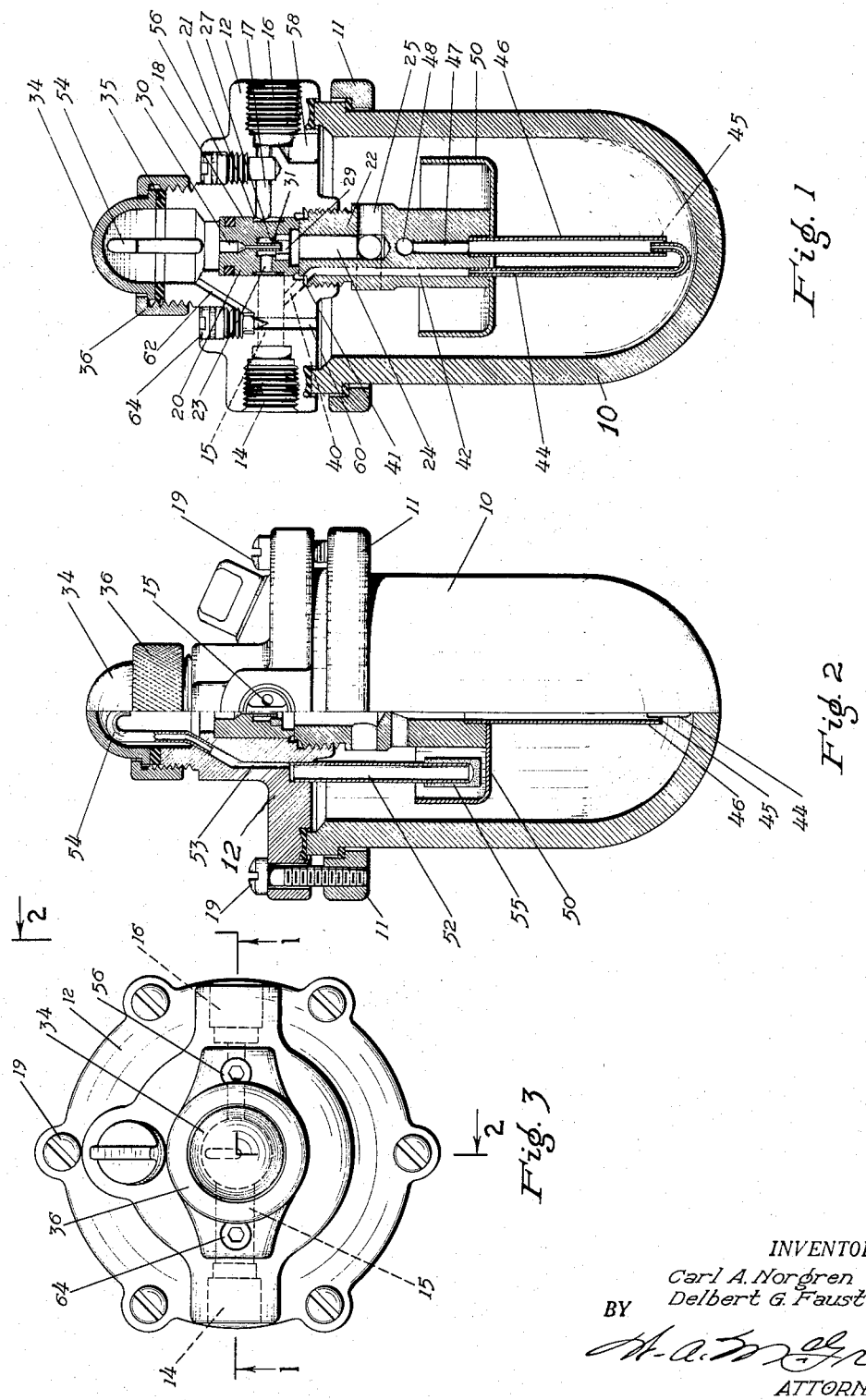
INVENTOR.
Carl A. Norgren
Delbert G. Faust
BY
ATTORNEY

United States Patent Office 2,718,934
Patented Sept. 27, 1955

2,718,934

OIL FOG GENERATOR

Carl A. Norgren, Denver, and Delbert G. Faust, Littleton, Colo., assignors to C. A. Norgren Company, Englewood, Colo., a corporation of Colorado Application September 12, 1952, Serial No. 309,328

7 Claims. (Cl. 184—55)

This invention relates to an apparatus for generating aerosols and the like, and more particularly it relates to a generator for injecting a fog or mist of a fluid into a stream of compressed gas.

Machinery and tools have been powered by compressed gas, and in particular compressed air, for a substantial period. It has been discovered that the bearings of very high velocity machine parts are efficiently lubricated with a fog of oil under a relatively low flow of compressed air. Further, pneumatic tools are commonly lubricated by injecting such a fog into the compressed air driving such tools.

It is know that in lubricating high speed parts too much lubricant is detrimental as is too little lubricant. Since lubrication is so critical, exact control of the amount of lubricant injected into the compressed air is essential.

According to the present invention a device is provided which may be accurately controlled over a wide range of operating conditions. Further, once set, the lubricator provides the same amount of lubrication without variance until the lubricator runs out of lubricant. This feature is especially valuable under low air flows, as the lubricant used is generally measured by a very few drops per minute. The common type lubricators of to-day provide a lubricant reservoir suspended below the lubricator body which is attached to the air line. The lubricant is drawn by suction up to the body for mixing with the air. As the lubricant level in the reservoir drops, the hydrostatic head decreases, increasing the oil lift and necessitating a change of adjustment of the lubricator in order to maintain the desired rate of oil feed.

Included among the objects and advantages of the present invention, is a lubricator which provides a constant level lubricant feed supply. The lubricator also provides a lubricant feed control independent of the feed conveying means whereby a fully open feed tube is available at all times. Further, the lubricator permits a variable dilution control, whereby the amount of compressed gas may be varied without varying the amount of lubricant per unit time.

Referring to the drawings:

Figure 1 is a cross sectional view of a device according to the invention,

Figure 2 is a partial sectional view of side elevation of the device of Figure 1, and Figure 3 is a top elevation of the device.

The lubricator or aerosol generator has a body 12 and a fluid reservoir 10. The reservoir may be attached to the body by any suitable means, however, it is preferably detachably connected. As shown, the reservoir is held to the body by means of a retaining ring 11 secured by bolts 19. The body has a threaded inlet 14 and a threaded outlet 16 for connection into a compressed gas conduit.

A passage 15 interconnects the inlet 14 with a venturi plug 20. An annular groove 21 provides a by-pass, for a portion of the gas, leading to a passage 17. The venturi plug 20 substantially fills a lateral bore 18, which intersects passage 15 and passage 17. The plug 20 is retained in position by a diffusion plug 22 threaded into bore 18.

The venturi plug 20 has a small bore 23 opening into passage 15. The bore 23 debauches into a manifold 27 which feeds a venturi throat 29. The venturi plug 20 has an axially aligned bore 30, which terminates in a small tube 31 in the venturi throat. The venturi throat 29 exhausts into bore 24 of the diffusion plug 22. A plurality of lateral vents 25 provides a large volume exit for air and lubricant going through the venturi.

A transparent dome 34 supported on the body 12 closes the end of the venturi plug 20 and provides a chamber for the low pressure area created by the passage of compressed gas through the venturi plug. The dome 34 is seated on an O ring seal 35, and is secured to the body by a threaded ring 36.

An oblique bore 40 intersects passage 15, and terminates in an annular groove 41 in the bore 18. A vertical bore 42 in the diffusion plug 22 communicates with the groove 41. A portion of gas from passage 15 goes through bore 40, the annular groove 41 and the bore 42. A small bore tube 44 is attached in bore 42 and the free end thereof is bent into the free end 45 of a tube 46 attached to the diffusion plug 22. The tube 44 fits loosely into tube 46, so that fluid from the reservoir 10 flows freely into tube 46. A bore 47 in the diffusion plug 22 communicates with the tube 46, and the end thereof intersects a lateral bore 48. Gas passing through tube 44 exhausts into tube 46, through bores 47 and 48, carrying with it slugs of fluid. The fluid so carried up flows out of bore 48 and is caught in a cup-shaped container 50 attached to the diffusion plug 22. The tube 44 has a restricted opening therethrough, to meter the flow of gas into tube 46. This system, commonly known as a jet pump, keeps the container overflowing at all times since the pump is in operation at all times that gas is passing through the device.

A fluid supply tube 52 conveys oil from the container 50 to the chamber under dome 34. The tube 52 is connected with a bore 53 forming a communication from the reservoir to the chamber under the dome. A drip tube 54 is connected to bore 53 in this dome chamber, and it has a reverse bend on the free end thereof. The free end of tube 54 terminates somewhat above the dome retaining ring, and provides visual means to ascertain the amount of fluid entering the dome chamber. Fluid from the constant level container 50 is filtered before it enters tube 52 by a filter element 55 attached to the free end of the tube 52.

A vertical bore 60 and connecting oblique bore 62 interconnects the dome chamber and the reservoir. An adjustable needle valve 64 intersects the two bores, and provides means for varying the pressure in the dome chamber. The low pressure created in the dome chamber by the passage of gas through the venturi, may be varied by opening or closing the valve 64. The pressure differential between the low pressure of the dome chamber and the high pressure of the reservoir, draws fluid from the constant level container 50 to the dome chamber via the feed system 52, 53 and 54. Thus the rate of fluid feed may be controlled by varying the pressure differential between the dome chamber and the reservoir.

An outlet passage 58 interconnects the reservoir with outlet 16. The passage 58 provides egress means for the aerosol exhausting from the diffusion plug 22. The amount of gas by-passing the venturi plug 20 may be controlled by means of a plug valve 56 intersecting passage 17. The aerosol may be variously diluted by controlling the amount of by-passed gas exhausting into outlet 16.

In one application, the device of the present invention may be used to supply a fog or mist of oil into a stream of compressed air, for lubricating moving parts of various mechanisms. In operation, the device is connected into compressed air conduit by means of the threaded connections 14 and 16. Air enters the device through the inlet 14, and then into passage 15. A portion of the air enters passage 23 in the venturi plug 20, and hence into manifold 27. The air flows from the manifold into venturi throat 29 and subsequently into passage 24 of the diffusion plug 22. Air leaving the manifold 27 flows past the tube 31 which constricts the throat 29. The constricted passage greatly increases the velocity of the air, causing a low pressure area in the passage 30 leading to the chamber under dome 34. Air from passage 24 exhausts into the reservoir 10 through the lateral diffusion opening 25, substantially pressurizing the reservoir.

Part of the air entering passage 15 flows through oblique bore 40 into the manifold 41 and into the vertical bore 42. The air from the bore 42 flows through the tube 44 and into the tube 46 connected with the bores 47 and 48 in the diffusion plug. Since connection between tube 44 and tube 46 is loose, oil from the reservoir enters the tube 46 through the end 45. The air traveling up tube 46 carries slugs of oil which are exhausted through the lateral bores 48. The amount of air passing through the jet pump is limited by the diameter of the bore of tube 44, so that a substantial amount of the oil normally flows out of the lateral bores 48 into the container 50. The jet pump operates at all times that air is flowing through the device so that the container 50 is kept full and overflowing. The system is so proportioned that the output of the jet pump exceeds the maximum rate of withdrawal from the oil cup 50 thus maintaining the oil cup brim full under all operating conditions. The container 50 is used as a constant level supply from which the oil feed is taken. The hydrostatic head between the supply cup and the feed indicator remains constant, irregardless of the level of oil in the reservoir. The lubricator may, therefore, be adjusted for certain conditions, and the oil flow will remain constant irrespective of oil level in the bowl.

The low pressure created in the chamber under the dome 34 by the passage of air through the venturi plug draws oil from the container 50 up through the supply system 52, 53 and 54 into the dome chamber. Oil flowing from tube 54 flows into passage 30 and is intimately mixed with air in throat 29, atomizing a portion of the oil. Large droplets of oil are separated as the oil-air mixture exhausts through the diffusion plug and enters the space above the oil in the reservoir 10. The oil fog in the reservoir exhausts through passage 58 to the outlet 16 which is connected to the air conduit.

Passages 60 and 62 interconnect the reservoir with the dome chamber. A needle valve 64 intersects the passages, and provides means for opening and closing this conduit. The needle valve 64 permits the adjustment of the pressure differential between the dome chamber and the reservoir, whereby the amount of oil drawn up through the supply system is controlled. The amount of oil passing through the supply system is normally adjusted to flow at a relatively few drops per minute. The amount of oil which is atomized and subsequently passes through the outlet 16 is a small percent of the amount of oil dropping from the drip tube 54. The amount of oil actually exhausted into air conduit varies depending upon operating conditions, but averages about 5% of the oil dropping from the drip tube 54. This gives a fairly accurate control of the amount of oil ultimately going into the air line. The heavier particles of oil, which are not sufficiently atomized to be carried out through passage 58, drop back into the reservoir for recycling.

The annular groove 21 around the venturi plug opens into the passage 17. The amount of air by-passing the venturi plug is controlled by means of plug valve 56. The valve 56 provides means for adjusting the volume of air passing through the device without substantially changing the amount of oil atomized per unit of time. This feature permits the use of a large volume of air with a small amount of the lubricant fog, or a small amount of air with a large amount of lubricant fog.

Where the maximum amount of oil atomized into the air is desired the needle valve 64 is completely closed, and the by-pass plug valve 56 is completely closed. Under these conditions substantially all the air passes through the venturi plug, creating the maximum pressure differential between the dome chamber and the reservoir, and consequently the maximum rate of oil feed. By opening the plug valve 64, however, a maximum amount of air can pass through the lubricator with a minimum of oil atomized therein. The lubricator is, therefore, adaptable for use over a wide range of air pressures and air flows, with a wide range of oil consumption. The constant level feed supply permits continuous operating without readjustment to compensate for varying oil levels in the reservoir. The dome-shaped drip chamber has a very wide range of visibility, so that the dripping of oil may be seen from any side of the lubricator, facilitating control.

Others may readily adapt the invention for use under various conditions of service, by employing one or more of the novel features disclosed or equivalents thereof. As at present advised with respect to the apparent scope of our invention, we desire to claim the following subject matter.

We claim:

1. An oil fog generator which comprises an imperforate oil reservoir having one closed end and one open end, a body associated with said reservoir closing said open end, a passage through said body adapted to pass a stream of compressed gas, said passage having inlet and outlet conduit connections, a lateral bore in said body intersecting said passage, a venturi plug in said bore partially closing said passage adapted to direct a portion of the gas in said passage into said reservoir and by-passing the remainder into the outlet of said passage, said venturi plug adapted to form a low pressure area under the influence of a stream of gas passing therethrough into said reservoir, a small cup-shaped container juxtaposed within said reservoir adapted to hold a quantity of oil, a supply tube extending from the bottom of said reservoir to said container, a jet pump associated with said supply tube for pumping oil from said reservoir to said container under the influence of gas passing through said generator, whereby said container is maintained completely full, a chamber associated with said body adapted to confine said low pressure area, an oil tube interconnecting said container and said chamber whereby under a constant head oil is conveyed from said container to said chamber and to intimately mix with gas passing through said venturi plug, a diffusion plug adapted to convey said oil-gas mixture to the space in said reservoir above said oil and separate large oil particles from said mixture, a passage way connecting said oil reservoir and said outlet adapted to pass the oil-laden gas into said conduit, passage interconnecting said oil reservoir and said chamber, a valve in said passage adapted to open and close said passage whereby the pressure in said chamber may be varied to control the flow of oil through said oil tube, and a valve in said passage adjacent said outlet adapted to vary the amount of gas bypassing said venturi plug to dilute said oil-laden gas.

2. An oil fog generator which comprises an oil reservoir having one closed end and one open end, a body associated with said reservoir closing said open end, a passage means through said body adapted to pass a stream of compressed gas, a lateral bore in said body intersecting said passage, a venturi means in said bore adapted to direct a portion of the gas in said passage into said reservoir, said venturi means adapted to form a low pressure area under the influence of a stream of air passing therethrough, a container means juxtaposed within said reservoir adapted to hold a quantity of oil, means for maintaining said container means completely full, chamber means associated with said body adapted to confine said low pressure area, means interconnecting said container and said chamber whereby under a constant head oil is conveyed from said container to said chamber and to intimately mix with gas passing through said venturi plug, means adapted to convey said oil-gas mixture to said reservoir, means connecting said oil reservoir and said outlet adapted to pass the oil-laden gas out of the generator and adjustable means to vary the pressure in said chamber to control the flow of oil to said chamber means.

3. An oil fog generator which comprises an oil reservoir, a body associated with said reservoir, a passage having inlet and outlet conduit connections through said body adapted to pass a stream of compressed gas, a venturi plug partially closing said passage adapted to direct a portion of the gas in said passage into said reservoir and by-passing the remainder into the outlet of said passage, said venturi plug adapted to form a low pressure area under the influence of a stream of air passing therethrough, a small cup-shaped container juxtaposed within said reservoir adapted to hold a quantity of oil, a supply tube extending from the bottom of said reservoir to said container, pump means for pumping oil from said reservoir to said container, whereby said container is maintained full, a chamber associated with said body adapted to confine said low pressure area, an oil tube interconnecting said container and said chamber whereby under a constant head oil is conveyed from said container to said chamber and to intimately mix with gas passing through said venturi plug, means for separating large particles of oil from said mixture whereby said mixture leaving said generator is substantially a fog, a passage way connecting said oil reservoir and said outlet adapted to pass the oil-laden gas into said conduit, a passage interconnecting said oil reservoir and said chamber to control pressure therein, and a valve in said passage adjacent said outlet adapted to vary the amount of gas by-passing said venturi plug to dilute said oil-laden gas.

4. A fog generator for compressed gas systems comprising a fluid reservoir, a body interconnected with said reservoir, passage means adapted to pass a stream of compressed gas, means in said reservoir to maintain a portion of the fluid at a predetermined level, means for supplying fluid from said predetermined level means to said passage means, a hemispherical transparent chamber associated with said fluid supplying means for visually determining the rate of feed, and means intermixing said fluid and said gas into a fog.

5. A fog generator for a compressed gas system comprising a liquid reservoir, a body interconnected with said reservoir, means for securing said generator to said system, passage means through said body for passing a stream of compressed gas, means in said reservoir for maintaining at least a portion of liquid at a predetermined level, means for passing a variable proportion of the gas in said passage means into said reservoir, means for supplying liquid from said predetermined level for admixing with the gas passing into said reservoir, and means for passing admixed liquid and gas from said reservoir to said compressed gas system.

6. A fog generator for a compressed gas system comprising a liquid reservoir, a body interconnected with said reservoir, means for securing said generator to said system, passage means through said body for passing a stream of compressed gas, means in said reservoir for maintaining at least a portion of liquid at a predetermined level, venturi means in said passage for passing a variable proportion of the gas in said passage means into said reservoir, means for supplying a controlled amount of liquid from said predetermined level for admixing with the gas passing into said reservoir, and means for passing admixed liquid and gas from said reservoir to said compressed gas system.

7. A fog generator for a compressed air generator system comprising a liquid reservoir, a body interconnected with said reservoir, means for securing said generator to said system, passage means through said body for passing a stream of compressed gas, cup means in said reservoir for maintaining at least a portion of liquid at a predetermined level, gas jet pump means for pumping liquid from said reservoir to said cup for maintaining said cup brimfull, venturi means in said passage for passing a variable proportion of the gas in said passage means into said reservoir, means inclusive of a sight chamber for visually determining the rate of liquid feed for supplying a controlled amount of liquid from said predetermined level for admixing with the gas passing into said reservoir, and means for passing admixed liquid and gas from said reservoir to the remainder of the gas in said passage means.

References Cited in the file of this patent

UNITED STATES PATENTS

| | | |
|---|---|---|
| 1,841,839 | Morton | Jan. 19, 1932 |
| 2,564,309 | Norgren | Aug. 14, 1951 |
| 2,572,440 | Brush | Oct. 23, 1951 |
| 2,613,067 | Goodyer | Oct. 7, 1952 |
| 2,656,899 | Ketelsen | Oct. 27, 1953 |